Figure 1:
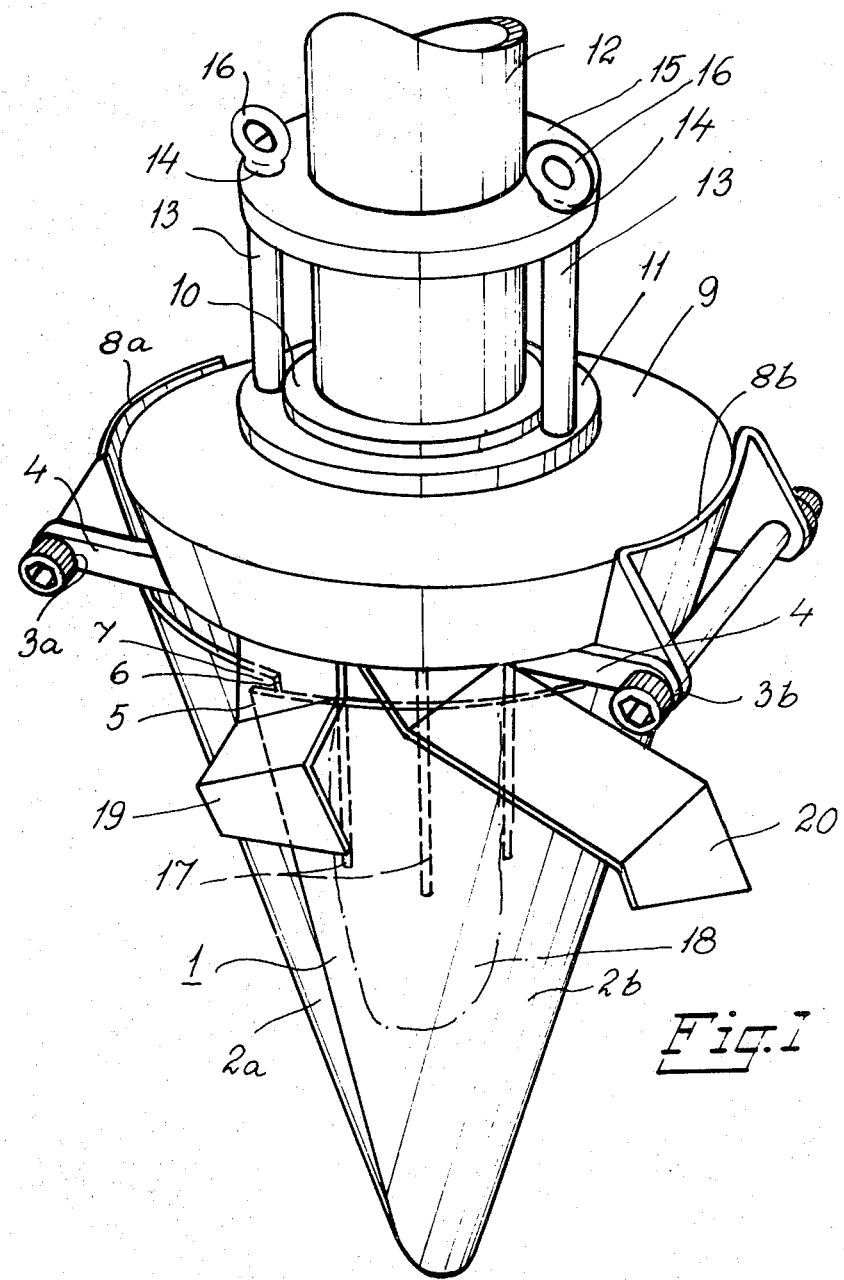

United States Patent [19]
Tormstrom

[11] 3,765,347
[45] Oct. 16, 1973

[54] PLANTING DEVICE

[75] Inventor: Ingvar Tormstrom, Ockelbo, Sweden

[73] Assignee: Kopparfors AB, Ockelbo, Sweden

[22] Filed: Feb. 7, 1972

[21] Appl. No.: 224,101

[52] U.S. Cl. .................................... 111/4, 111/89
[51] Int. Cl. ............................................ A01c 11/00
[58] Field of Search .................... 111/4, 92, 2, 89

[56] References Cited
UNITED STATES PATENTS

| | | | |
|---|---|---|---|
| 617,403 | 1/1899 | Masters | 111/4 |
| 2,216,720 | 10/1940 | Cousins | 111/4 |
| 2,775,948 | 1/1957 | Wilson | 111/4 |

Primary Examiner—Robert E. Pulfrey
Assistant Examiner—Stephen C. Pellegrino
Attorney—Linton & Linton

[57] ABSTRACT

A planting device comprises a hollow conical member, which consists of at least two segments, being pivotally connected to a rotatably arranged holder having a guide for the plant. The segments may be locked in a first position in which relative narrow longitudinally extending openings are generated between the segments which are so shaped that mould will be pressed into the conical member through said openings when the holder is rotated. After planting the locking is released thereby admitting the segments to be automatically swung outwardly when the device is lifted up.

6 Claims, 2 Drawing Figures

PLANTING DEVICE

This invention relates to planting equipments and has for its purpose to provide a planting device by means of which planting and cultivation may be carried out in one single operation.

To obtain this and other objects the invention is carried out according to the accompanying claims. In the drawings which show an exemplary embodiment of the invention FIG. 1 is a perspective view of a preferred embodiment of the invention during the planting operation.

Figure 2:
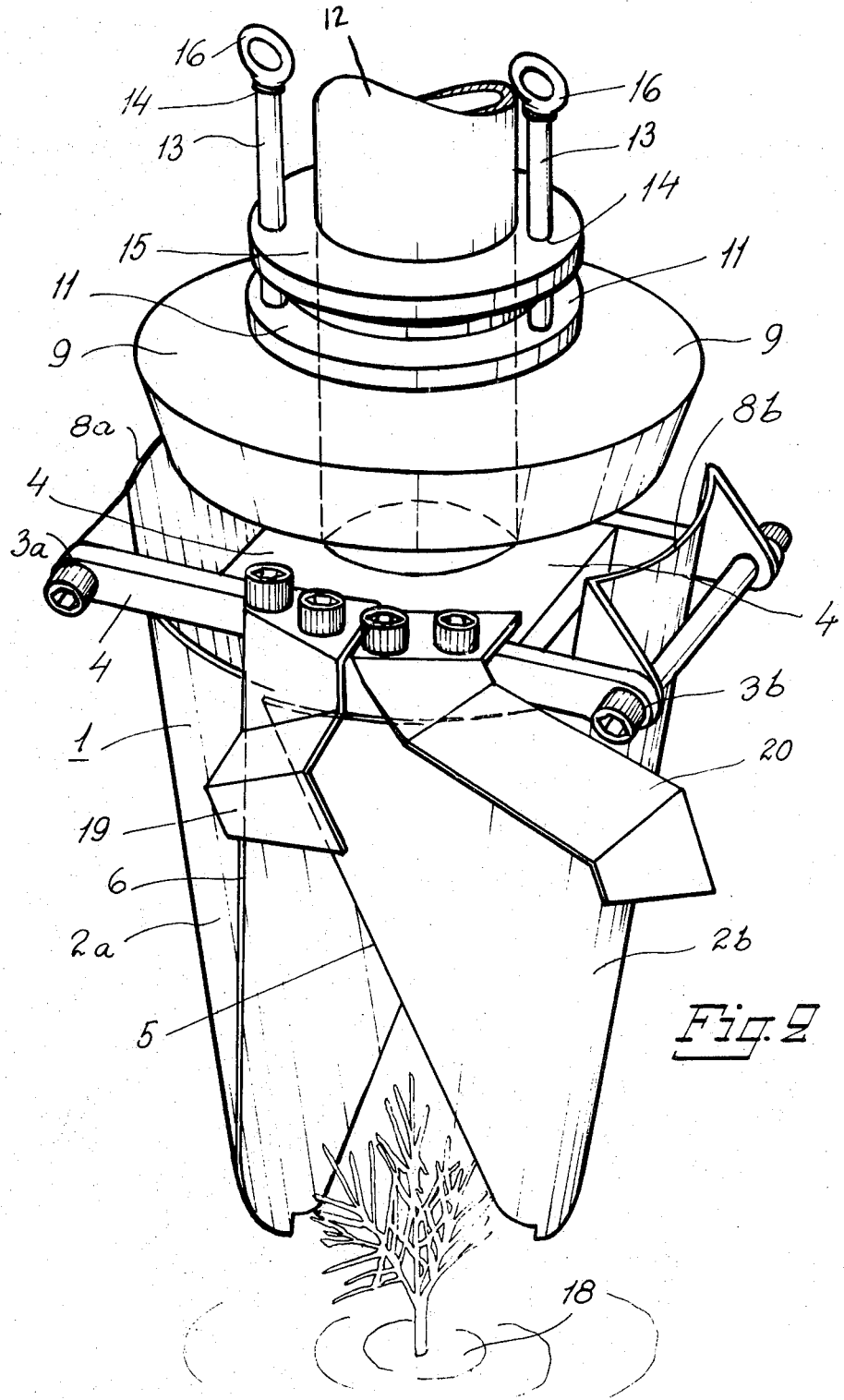

FIG. 2 shows also in a perspective view the device when being lifted up after planting.

The new planting device includes a hollow cone, generally designated 1 and having the apex pointing downwards. Said cone comprises two halves 2a, 2b which by means of pivots 3a, 3b are pivotally connected to a holder 4. The conical halves 2a, 2b preferably consist of pointedly cut tube segments having the same radius along their entire length. The halves 2a, 2b are adapted relative to each other in such a manner that their adjacent edges 5, 6 will be located at a radial distance from each other thereby generating a longitudinal space 7 between said edges. The conical halves are extended upwardly 8a, 8b in direction away from their pivot points 3a, 3b. A locking member 9, which preferably consists of a body the outer surfaces of which having the same conicity as the extensions 8a, 8b, normally acts upon said extensions to hold the halves in the position shown in FIG. 1. The locking member has a cylindrical central portion which by means of a reduced portion penetrates a circular plate 11 and with a thicker flange portion 10 contacts the upper side of plate 11 such that said locking member may be moved with the plate when the latter is moved upwardly. Plate 11 is displaceably adapted upon a tube 12, which as will be apparent from the following at the same time serves as a supply tube for the plants and also as a driving shaft for the parts being active in the earth cultivation. Two bolts 13 extend through holes 14 in a plate 15, secured to or displaceable relative to the tube 12 and are prevented from leaving said plate by means of preferably eye-shaped heads 16 which cannot pass through the holes 14. In their free ends the bolts 13 are connected to the lower plate 11. It is obvious that the locking member may be moved to its upper, inactive position in that the bolts 13 for instance by means of wires or the like, connected to their eyes 16, are moved upwardly. In its lower end the tube 12 is connected to holder 4, which may consist of a plane plate having a centrally disposed opening enabling the plant to pass through. Extending downwardly from holder 4 are a number of circularly disposed rods 17 having for purpose to guide the root tuber 18 of the plant. It is obvious that the tuber when introduced in the cone 1, which is closed as seen in FIG. 1, will rest with its lower portion against the inne surfaces of the cone. Connected to holder 4 are further a number of earth surface preparing members 19 resply. 20 which in pairs treat the vegetation surrounding the planting hole in an inner and an outer zone. Said members are preferably constructed in such a manner that they tear the vegetation and at the same time remove it from the planting hole. In the embodiment here shown cone 1 is closed downwardly but it is also possible to have one half extending with its point below the corresponding point of the other half. By doing so the advantage is obtained that the cone during its rotation automatically tends to dig itself into the earth. The device here described and illustrated in the drawings functions in the following manner:

With the plant and the parts of the planting device in the position shown in FIG. 1 tube 12 is brought into rotation. The hollow cone and the parts attached thereto will then dig theirselves into the earth. One of the edges 5, 6 thereby serves as a cutting means and the removed material (the soil or mould) is pressed into the cone 1 through the spaces 7 and is packed around the tuber. Shortly before the hole drilling action is completed the earth preparing members 19, 20 come into contact with the earth surface and remove the vegetation therefrom. The planting operation is now completed and the locking member 9 is moved upwardly by pulling the eyes 16 upwardly. The halves 2a, 2b will then be free to pivot about their pivots and when the device is thereupon raised the mould being packed inside the hollow cone will cause the halves to automatically swing outwardly such that the device without interfering with the plant may be removed according to FIG. 2. It is thus obvious that planting may be carried out very rapidly. A further advantage is that the planting parameters such as planting depth and the like may be held within close limits, depending upon the dimensioning of the device.

The invention may be varied in many respects. Tube 12 may for example be stationary so that only the halves 2a, 2b and the surface treating members may rotate.

I claim:

1. A planting device comprising a tubular member, a holder means secured to the lower end of said tubular member and having a central opening communicating with the opening of said tubular member, an earth preparing member having the general shape of a hollow cone having its apex directed downwardly and comprising at least two sections being pivotally connected to said holder means intermediate their upper and lower ends, a locking means mounted about and axially displaceable along said tubular member, said section portions located above their pivot being capable of bearing against said locking means such that said sections are held together so as to form the hollow cone when said locking means is in a lower position while said sections are permitted to swing out from each other when said locking means is in an upper position, said sections being so shaped and arranged relative to each other that a space is constituted between the envelope surfaces of two adjacent sections, said space constituting together with the adjacent edge portions of said sections a cutting means as well as a channel enabling soil or mould to enter into the interior of the earth preparing member upon rotation of said earth preparing member.

2. A planting device as claimed in claim 1 characterized in that said sections consist of pointed tubular segments having the same radius along their entire length.

3. A planting device as claimed in claim 1, characterized in that said holder means is provided with a numbe of downwardly directed means for guiding the tuber of the plant within the earth preparing member.

4. A planting device as claimed in claim 1, characterized in that the earth preparing member is further provided with a number of earth treating members intended to remove during their rotation vegetation surrounding the plant and to throw away stones and similar loose objects, said earth surface treating members being located at different distances from the center of the earth preparing member.

5. A planting device as claimed in claim 1, characterized in that said locking means has in its upper part a flange portion, an annular member surrounding said flange portion, at least two bolts on said annular member, a plate slideably mounted on said tubular member and having openings with said bolts extending therethrough, means for raising said bolts causing said bolts and consequently also said locking means to follow annular member in its vertical upwards movement.

6. A planting device as claimed in claim 1, characterized in that one of said sections constituting the cone has a point projecting beyond a corresponding point of another of said sections such that said cone when rotated tends to dig itself into the earth.

* * * * *